Aug. 29, 1950 R. HARDY 2,520,141

PANORAMIC RECEIVER FOR RADIO SIGNALS

Filed May 24, 1943 5 Sheets-Sheet 1

INVENTOR
RENÉ HARDY
BY Edward D. Phinney
ATTORNEY

Aug. 29, 1950 R. HARDY 2,520,141
PANORAMIC RECEIVER FOR RADIO SIGNALS
Filed May 24, 1943 5 Sheets-Sheet 2
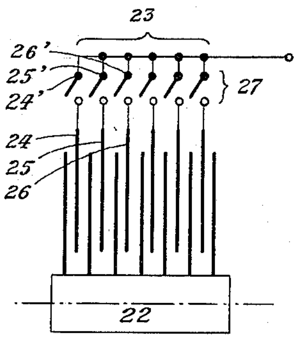
FIG.3
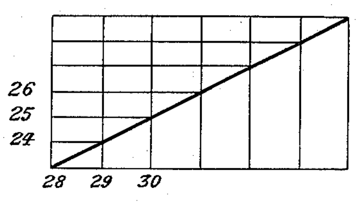
FIG.4
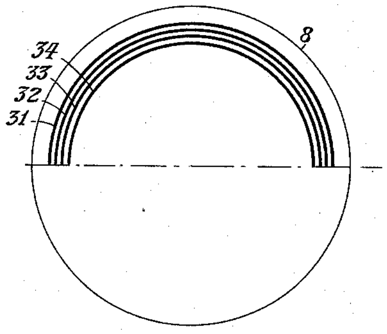
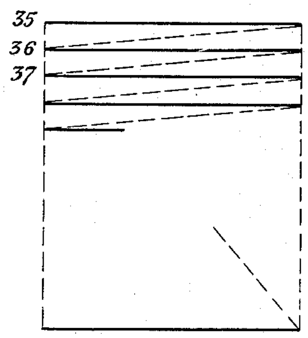
FIG.5A FIG.5B
INVENTOR
RENÉ HARDY
BY Edward D. Phinney
ATTORNEY Aug. 29, 1950 R. HARDY 2,520,141

PANORAMIC RECEIVER FOR RADIO SIGNALS

Filed May 24, 1943 5 Sheets-Sheet 3

INVENTOR
RENÉ HARDY
BY Edward D. Phinney
ATTORNEY

INVENTOR
RENÉ HARDY
BY Edward D. Phinney
ATTORNEY

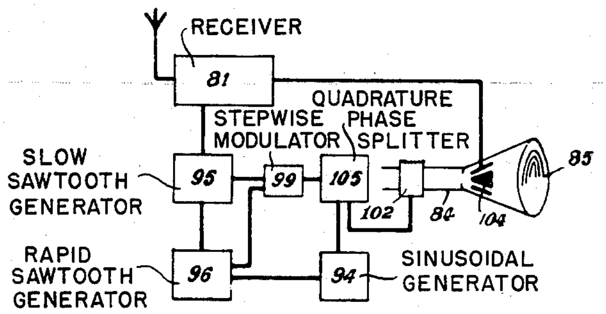
FIG. 8B
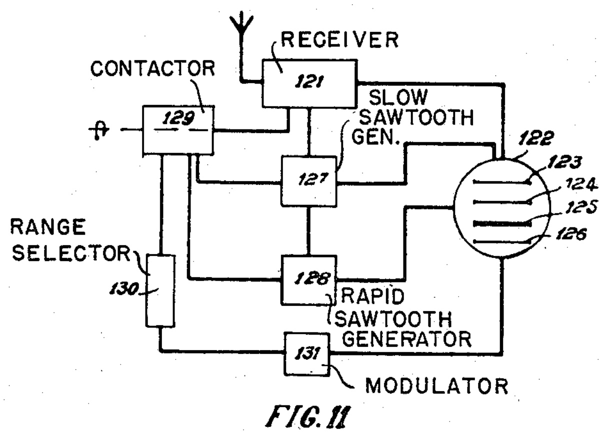
FIG. 11
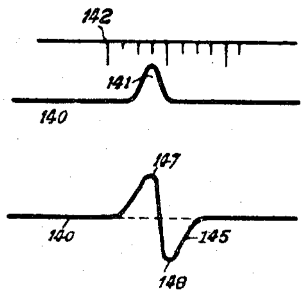
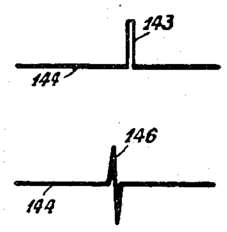
FIG. 12 FIG. 13
INVENTOR.
RENÉ HARDY
BY Edward D. Phinney
ATTORNEY Patented Aug. 29, 1950 2,520,141

UNITED STATES PATENT OFFICE 2,520,141

PANORAMIC RECEIVER FOR RADIO SIGNALS

René Hardy, Lyon, France, assignor to International Standard Electric Corporation, New York, N. Y.

Application May 24, 1943, Serial No. 488,296
In France June 21, 1941

Section 1, Public Law 690, August 8, 1946
Patent expires June 21, 1961

3 Claims. (Cl. 250—20)

The present invention relates to indicating systems for the observation of simultaneous phenomena over a wide frequency band, and particularly for the observation of the indications in receivers of radio transmissions that take place.

As a rule, indicating systems of this kind comprise an indicating instrument that can be read almost instantaneously, such as a cathode ray oscillograph that has its scanning controlled in synchronism with the scanning by the receiver of a definite frequency band. The scanning by the receiver is carried out continuously and automatically, and, every time that a transmission is in progress at a point of the variable reception band of the receiver, a corresponding luminous trace appears on the screen of the cathode ray tube. The separation of the traces depends on the selectivity of the receiver and the size of the scale with respect to the total frequency band that is being scanned.

If it is desired to cover a wide frequency band with the same receiver, then this band should be divided into several wave ranges. One of the objects of the invention is to provide means for correspondingly dividing the various reference scales on the screen of the cathode ray tube, so as to be able to determine the wave range in which an indication from the transmitting station lies. The intervals between the simultaneous indications from the transmitting stations, may thus be widened and the reading of the indications facilitated.

More specifically, one object of the invention is the providing, in systems of this kind for supervising transmissions in progress in a certain frequency band, of means for causing the simultaneous appearance on the screen of an indicating instrument, e. g. a cathode ray oscillograph, of a great number of reference lines, fairly close together, on which the luminous traces of the transmitting stations that are operating in each of the corresponding frequency ranges will appear separated with greater definition.

The frequency scanning of the control receiver and, therefore, of the indicator, may be effected either mechanically or electronically. Mechanical scanning may be effected by means of a rotating plate condenser that tunes the receiver. Electronic scanning may be controlled by a voltage of sawtooth or other special shape applied to an oscillatory circuit of the receiver, e. g. to the intermediate frequency oscillator of the receiver if the latter is of the superheterodyne type.

According to certain of its features, the invention provides means for the automatic switching, either mechanically or electronically, of the frequency scanning devices of a control receiver, while simultaneously modifying, according to a suitable law, the scanning characteristics of the associated indicating instrument in order to cause the appearance on this indicator of several reference lines corresponding to the frequency ranges over which the frequency scanning devices of the receiver are switched. This switching must be sufficiently rapid so that the successive reference lines that appear on the indicator appear sufficiently continuous for an observer to see them at all times.

According to another feature of the invention, means are provided for illuminating separately or more intensely one of the scanning lines thus obtained during the frequency sweep in order to know at all times the range that is being scanned.

These objects and features, as well as others, will be explained in detail in the following description with reference to the appended drawings which illustrate a certain number of embodiments of mechanical frequency scanning and of electronic frequency scanning of the control receiver. In these drawings:

Fig. 3 illustrates schematically one example of a rotating plate condenser with several tuning ranges, particularly adapted to the receiver of Fig. 2;

Fig. 4 illustrates the variation of capacity of the condenser of Fig. 3;

Figs. 5A and 5B show two examples of reference lines that can be obtained on the screen of a cathode ray tube indicator in a control receiver having several frequency ranges, and particularly but not exclusively in a receiver of the kind shown in Fig. 2;

Fig. 8 illustrates schematically one example of a control receiver having several frequency ranges that employs a purely electronic scanning;

Figs. 8A and 8B show two possible modifications of the circuit of Fig. 8;

Fig. 9 shows scanning curves used in the receivers of Figs. 8, 8A and 8B;

Fig. 11 is a schematic view of still another example of an arrangement of a control receiver having several ranges of frequencies; and Figs. 12 and 13 show various types of luminous traces or pulses that can be obtained in the control indicators.

Figures 1, 1A, 1B, 2:
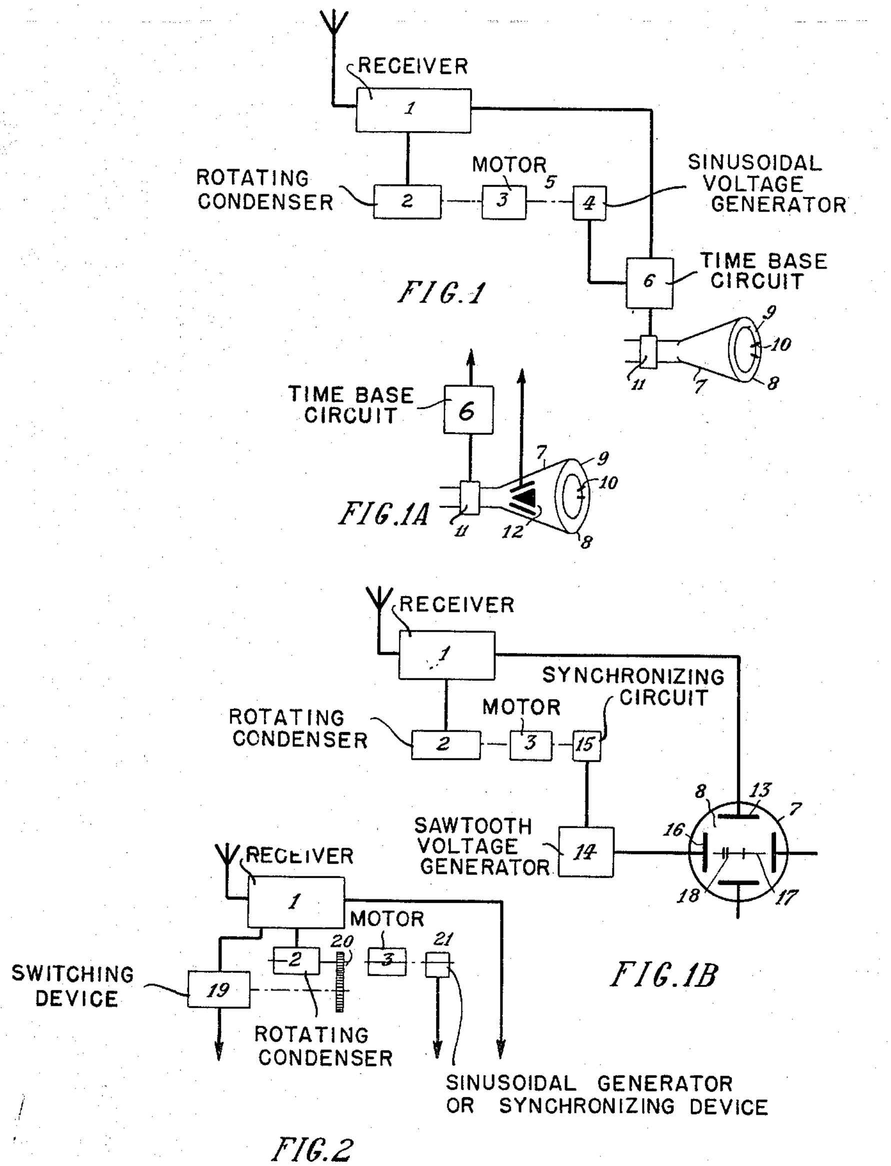
Fig. 1 illustrates schematically one example of the arrangement of a control receiver in which frequency scanning or tuning is accomplished by a rotating plate condenser.
Figs. 1A and 1B illustrate two variations of the control receiver of Fig. 1.
Fig. 2 is a schematic view of one example of a control receiver with rotating plate condenser for frequency scanning or tuning that is provided with means for effecting the automatic switching of the frequency ranges.

In the control system of transmissions in progress that is shown schematically in Fig. 1, the tuning of the receiver 1 is modified continuously by a rotating plate condenser 2 which is driven by a motor 3 and in such a way as to scan the total frequency band of the receiver, the switching from one band to another being effected in a manner that will be described below. A sinusoidal voltage generator A generates a voltage in synchronism with the rotation of the rotating plate condenser, as shown by dot and dash connection 5 between the driving motor 3 and the generator circuit 4. In practice, this circuit may consist of a resistance-equipped distributor fed by a source of direct voltage, the distribution of the resistances on the periphery of the distributor being sinusoidal and the rotor of the distributor being directly driven by the motor 3.

The outputs of the receiver 1 and of the sinusoidal voltage generator 4 are applied to a time base circuit 6 disposed, for example, in any well known manner for producing voltages in quadrature (if they have not been produced by the generator 4) for the circular scanning of the cathode ray indicator 7, these voltages being modulated by the output of the receiver 1. The modulated voltages are applied to the deflection elements 11 of the cathode ray tube 7, e. g. to orthogonal pairs of plates or coils of this tube. On the fluorescent screen 8 will appear a circular trace 9 that corresponds to the scanning of the generator 4 and radial luminous traces, such as 10, that correspond to operating transmitting stations that are momentarily tuned in as the receiver 1 is tuned through the band. By another method, the voltages of the sinusoidal generator 4 need not be put in quadrature but are applied, after modulation by the output of the receiver 1, to a magnetic coil rotating around the neck of the cathode ray tube 7 at the driving speed of the motor 3.

As shown in Fig. 1A, the circular scanning voltage generated by the circuit 6 may be applied without modulation to the deflection elements 11 of the cathode ray tube 7. This tube is, however, provided with a pair of concentric electrodes 12 between the deflection elements 11 and the screen 8. The voltages put out by the receiver 1 are applied to this pair of electrodes 12 in such a way that these voltages effect the radial deflections of the beam and consequently cause the traces to appear on the screen 8 indicating the stations which are transmitting.

The scanning of the cathode ray indicator 7 may be linear instead of circular. In this case, it may be desirable to use the arrangement shown in Fig. 1B. The output voltages of the receiver 1 are applied to the vertical deflection plates 13 of the cathode ray tube 7, while the horizontal scanning voltages are produced by a linear time base circuit, e. g. a sawtooth voltage generator 14 that is synchronized to the speed of the motor 3 by a special element or circuit 15 that is driven by the said motor. The linear base voltages from the generator 14 are applied to the horizontal pair of deflection plates 16 of the cathode ray tube. On the screen 8 of this tube there consequently appear the reference line 17 and the vertical traces 18 which reveal the stations whose signals are intercepted during the frequency scanning of the receiver 1 by the rotating plate condenser 2.

In these systems, the tuning condenser, when rotating, passes twice over the same frequency positions unless provision is made for a special cutting-off of the condenser segments. A double series of indications would appear on the screen of the acthode ray indicator unless the scanning of the indicator were suppressed in some suitable way during each alternate half turn of the condenser, or else unless the scanning speed of the oscillograph were double the speed of the condenser in order to utilize the complete circumference, and to make ineffective one scanning out of two of the indicator.

The switching of the ranges of frequencies may be effected by means of a device shown at 19 in Fig. 2, this switching device being driven by a motor 3 through a reduction gearing 20. In Fig. 2, 21 indicates either the sinusoidal generator 4 of Fig. 1 or the synchronizing device 15 of Fig. 1B. The switching device or wave range commutator may be provided, for example, in the manner shown in Fig. 3, i. e. associated with the rotating plate condenser.

In Fig. 3, the rotating plate condenser comprises a rotor 22 and a stator 23 which consists of a certain number of segments 24, 25, 26, . . . connected to a contactor 27 that has as many contacts 24', 25', 26' . . . as there are segments in the stator 23 of the condenser. The frequency range commutator 19 of Fig. 2 is disposed in such a way that contact 24' is closed upon the first rotation of the rotor 22 of the condenser 2, contact 25' is closed upon the second rotation of the rotor 22, etc. The variation of capacity produced in this way is like that shown in Fig. 4, for example. The first rotation of the rotor 22 changes the frequency from 28 to 29, the second rotation from 29 to 30, etc. corresponding to the successive closings of the contacts 24', 25' . . . of the contactor 27, and the switching in of the segments 24, 25 of the stator.

While effecting the successive closing of the contacts 24', 25', etc., the device 19 modifies at the same time the polarizations of the grid or of the anode of the cathode ray tube indicator, e. g. by modifying the adjustment of a potentiometer inserted in this grid or anode circuit in order to cause a corresponding angular displacement of the reference line on the screen of this indicator. If a circular deflection of the spot of the cathode ray tube is employed, this variation of polarization will cause a variation of the radius of the scanning circle, so that on the screen 8 there will appear a series of concentric circles or semicircles such as 31, 32, 33, 34 (Fig. 5A).

If use is made of a linear scanning of the screen of the cathode ray tube, the device 19, upon each closing of a contact 27, will control a circuit for slanting the reference line that corresponds to a range of frequencies, so that there will appear on the screen 8 a series of horizontal lines 35, 36, 37, etc. (Fig. 5B), the lines being slanting like the scanning lines of a television tube. Besides, use may be made for this purpose of the similar circuits well known in television. During each return of the cathode spot to the beginning of a line, the illumination may be cut off so as to omit any superfluous indications during the non-required half turns of the condenser 2.

Instead of arranging a switching of the segments of a rotating plate condenser, it is possible according to another feature of the invention to arrange a switching of inductances that form as many tuning circuits with a single condenser which is in continuous rotation.

Figure 6:
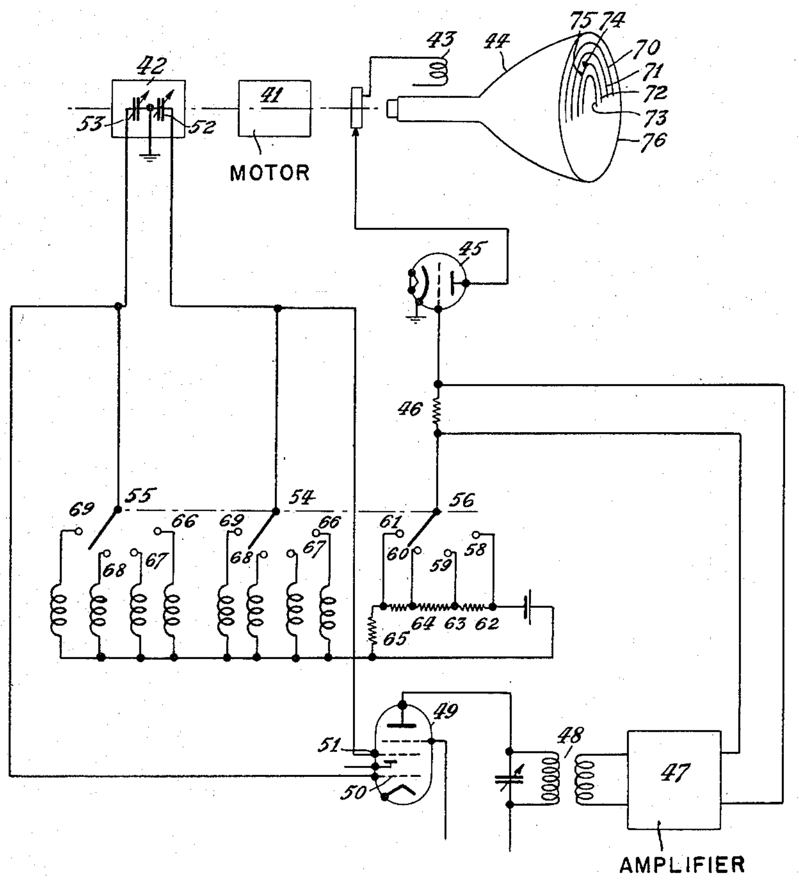
Fig. 6 is a schematic view, but in greater detail, of one example of a control receiver and of an associated indicator in the case when the band that is covered consists of several frequency ranges.

One embodiment of this is shown in Fig. 6 showing circular scanning of the cathode ray indicator. The driving motor 41 simultaneously drives the frequency scanning variable condenser system 42, which is balanced with respect to earth, and the circular magnetic deflection coil 43 around the cathode ray tube 44. The deflection coil is fed, for example, by the output tube 45 of the receiver. This output tube 45 comprises in its grid circuit a resistance 46 that is fed by the detected current of the amplifier 47 whose intermediate frequency input circuit 48 is, for example, connected to the frequency changing tube 49 which comprises an oscillator element 50 that may be incorporated in a modulator grid 51.

The variable condensers 52 and 53 are respectively connected to the tuning circuits of the grids 51 and 50. The first rotation of the circular scanning system, may move the commutator 54, 55, 56 into the first position connecting the tuning circuits at stud 66. When the arm of the contactor 54 is on the tuning circuit at stud 66, the grid of the output tube 45 is connected to the polarization voltage at stud 58. The commutator remains locked in this position during the complete scanning of the frequency range, i. e. during half a revolution of the coil 43. During this time, the spot describes the trajectory 70 on the screen 76 of the cathode ray tube 44. Upon completion of the first rotation, the contactors 54 and 55 are moved to the positions 67 of the tuning circuit and the polarization of the output tube 45 will be changed because the contactor 56 is automatically connected to the contact stud 59. The spot then describes a second trajectory 71 that is closer to the center of the screen 76 because the plate current of tube 45 is modified as a result of the change in the polarization voltage. Upon each complete rotation of the condenser 42, the contactors 54 and 55 will successively pass to new positions and each range of frequencies that is scanned will accordingly correspond to one of the semicircles 70 to 73 having different radii.

If it is desired to have complete circles as reference lines for the useful half-turn of the variable condenser 42, a reduction gearing must be used to cause the deflecting coil 43 to make a complete rotation around the cathode ray tube while the variable condenser 42 makes half a turn. The circuit that permits extinction of the spot during the non-required half turn of the variable condenser has not been shown in order to simplify the drawing, as this circuit is well known in itself.

Figure 7:
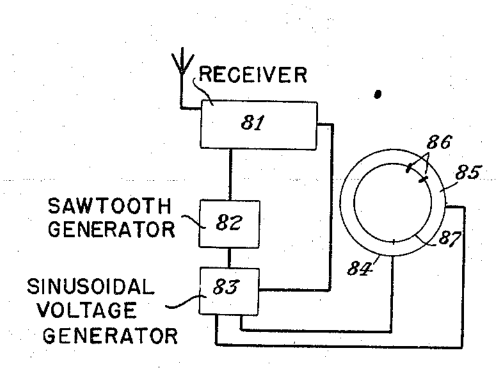
Fig. 7 illustrates schematically one example of a control receiver that employs an electronic frequency scanning or tuning of the receiver.
Figure 7A:
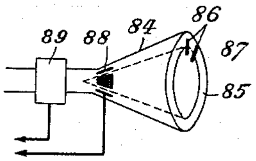
Fig. 7A shows a possible modification of the circuit of Fig. 7.

In case use is made of an electronic frequency scanning of the control receiver of the transmissions in progress in a certain band, an arrangement like that shown in Fig. 7 may be employed. The receiver 81 has its intermediate frequency oscillator controlled by a sawtooth voltage generating circuit 82 that effects the desired frequency scanning. This circuit 82 also controls the phase of a sinusoidal voltage generator 83 which is modulated by the output of the receiver 81. In this way, the voltage generated by the modulated generator 83 is applied to the indicating instrument 84 and causes the appearance on this indicator's screen 85 of a reference circle 87 that is modulated radially by the luminous traces 86 of the stations then transmitting within the supervised range of frequencies. In still another way, as shown in Fig. 7A, the output of the receiver is applied to a pair of concentric electrodes 88 of the cathode ray tube 84, while only the sinusoidal voltage produced by the generator 83, in synchronism with the sawtooth voltage generator 82, is applied to the circular deflection circuits 89 of the cathode ray tube.

Figures 8, 8A, 9:
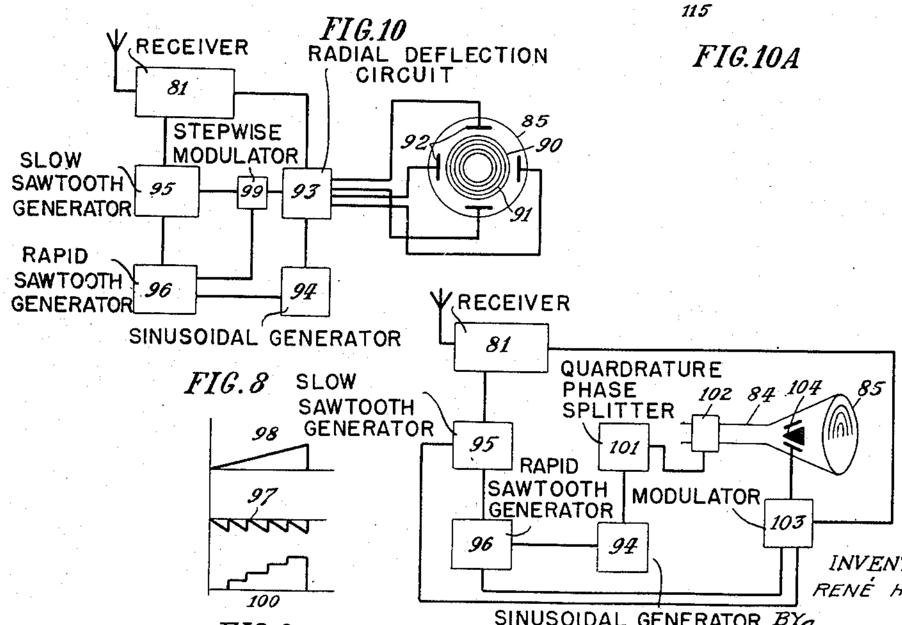

In order to effect the appearance on the screen of the cathode ray oscillograph 84 of several reference lines corresponding to various frequency ranges that are successively scanned by the electronic sweep of the receiver 81, use may be made of a circuit like the one shown in Fig. 8. The image obtained on the screen 85 consists of a series of reference circles 90, 91 . . . the total length of each circle corresponding to a scanned range of frequencies. These circles are produced by applying to the pairs of orthogonal plates 92 or other deflection elements of the cathode ray tube the output voltages of a radial deflection circuit 93, these voltages being modulated by the signals from the receiver 81. These voltages are generated at a high frequency by a circular scanning sinusoidal generator 94 in synchronism with the slow sawtooth voltage which is produced by the frequency scanning circuit 95 of the receiver and which has superposed on it a synchronous sawtooth voltage, but of the same frequency as that of the scanning sinusoidal generator 94.

This voltage 98 (Fig. 9) is generated by the circuit 96 and it modulates the slow sawtooth voltage 97 (Fig. 9) in the circuit 99 in such a way as to furnish a stepwise modulation of the kind shown at 100 in Fig. 9. It is this stepwise voltage that is used for the deflecting of the beam of the cathode ray tube 84 after having been modulated by the signals from the receiver 81 in the scanning circuit 93.

If, instead of the circles 90, 91, etc., it is desired to get only semicircles on screen 85, it will be sufficient to effect a half frequency scanning of the indicator and to extinguish the spot during the non-required semicircles in any known manner.

The method of scanning described above in connection with Fig. 8 for causing the appearance of several concentric circles on the screen 85 may be modified as shown in Figs. 8A and 8B. In these figures, in which the corresponding elements are indicated by the same reference numbers as in Fig. 8, use is made of a cathode ray tube 84 provided with a pair of concentric electrodes 104 for the radial deflection that furnishes the traces of the transmitting stations. In the circuit of Fig. 8A, the sinusoidal generator 94 has its output voltage transformed into two sinusoidal voltages in quadrature in circuit 101 and these two voltages are applied to the deflection elements 102, i. e. pairs of electrostatic plates or of magnetic coils, of the cathode ray tube 84 in order to effect the rapid circular sweeping of screen 85 by the cathode spot. Furthermore, the slow and rapid sawtooth voltages of generators 95 and 96, the latter synchronized with the sinusoidal voltage of generator 94, are applied to a modulator circuit 103 in such a way as to produce a stepwise output voltage that is furthermore modulated by the output of receiver 81 as shown. This stepwise voltage that is modulated by the received signals is applied to the pair of concentric electrodes 104 in order to produce at the same time the successive staggering of the reference circles according as the scanning proceeds from one range of frequencies to another, and the radial modulation that gives the indications of the transmitting stations in course of operation.

On the other hand, in the arrangement shown in Fig. 8B, the concentric electrodes 104 received directly the signals from the receiver 81, and the pairs of plates or coils 102 of the cathode ray tube are fed by the circular scanning voltages that successively produce the reference circles of different radii. These voltages are produced by the quadraturing circuit 105 which receives the sinusoidal voltage from the generator 94 in order to modulate it by the slow sawtooth voltage generated by circuit 95 once it has been modulated in circuit 99 by the rapid sawtooth voltage, synchronized by the sinusoidal generator 94, that is generated by circuit 96. In this way, the deflection elements 102 receive sinsoidal voltages in quadrature that are modulated by a stepwise voltage.

Figure 10:
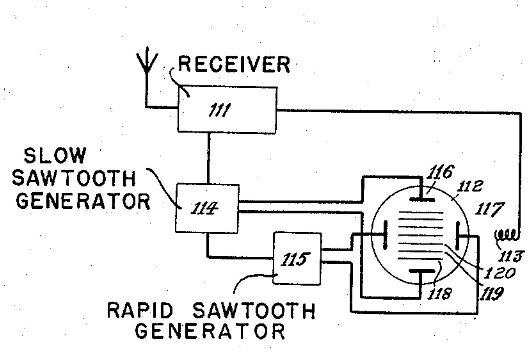
Fig. 10 is a schematic view of another example of an arrangement of a control receiver having several frequency ranges that uses an electronic scanning.
Figure 10A:
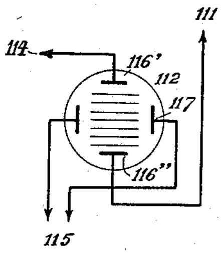
Fig. 10A shows a modification of the indicator circuit of Fig. 10.

If it is desired to employ a linear scanning, instead of the sweeping scanning of the preceding figures, and to cause the appearance on the cathode ray tube's indicating screen of a reference raster consisting of a certain number of slanting lines similar to the group of lines in Fig. 5B, use may be made of the arrangement of Fig. 10 or that of Fig. 10A.

In Fig. 10, the receiver 111 feeds a deflection circuit, e. g. a magnetic coil 113, of the cathode ray tube whose screen is shown at 112. The sawtooth voltage that serves to effect the frequency scanning of receiver 111 is supplied by the circuit 114 and is also utilized for the vertical scanning of the cathode ray tube, being applied to the vertical deflection elements 116 of the tube. This sawtooth voltage is relatively slow with respect to a second sawtooth voltage that is generated by circuit 115 and is synchronized with circuit 114 controlling the horizontal scanning of screen 112 through horizontal deflection elements 117 of the indicator. The frequency of this second sawtooth voltage is $n$ times greater than that of the first one and consequently the cathode spot will describe in complete horizontal lines 118, 119, 120 for each complete vertical scanning. The luminous traces that correspond to stations in course of operation will appear on these lines as a result of the deflection caused by the magnetic coil 113 that is fed by the received signals.

In the variation shown in Fig. 10A, the sawtooth voltage generated by the rapid linear base circuit 115 is still applied to the horizontal deflection elements 117 of the cathode ray tube, but one of the vertical deflection elements 116′ is connected to circuit 114 that generates the slow sawtooth voltage, while the other vertical deflection element 116″ is connected to the output of receiver 111.

If the desired frequency band is relatively wide, then use is made of a double frequency change. The receiver's frequency change oscillator is no longer modulated at the scanning frequency of the same, but at a much higher frequency so that the difference finally obtained and characterizing the range that is covered will be much greater. Electronic scanning methods of this kind are well known per se.

In the embodiment shown schematically in Fig. 11, the control receiver 121 is likewise scanned by means of a sawtooth voltage produced by circuit 127 by modulating the frequency of an oscillatory circuit of this receiver. However, during the frequency scanning of this receiver, a certain number of ranges are successively explored with different values of self-inductances and capacities, e. g. by automatic switching of the receiver to all the ranges, either mechanically by means of rotating contacts or relays at 129, or electronically in synchronism with the scanning of circuit 127.

On the screen 122 of the cathode ray indicating tube controlled by the scanning circuit 127 and another high speed scanning circuit 128 of a frequency which is a harmonic of the scanning frequency of receiver 121, each main line 123–126 described by the spot corresponds to a scanned range of frequencies. The total scanning may be completed in a time sufficiently short for the indications to persist in the retina of the observer's eye, and all the reference lines 123 to 126 will appear at the same time in one general image.

The vertical scanning circuit 128 is likewise synchronized with the range switching device 129, so that the first line 123 on screen 122 will always correspond to the first range that is covered, etc. Each horizontal line consequently corresponds to one frequency range.

According to one feature of the invention, the horizontal line that corresponds to the scanned range may be illuminated more strongly than the others. For this purpose, the automatic range switching device 129 controls the operation of a range selector 130 which acts on the control grid or other suitable electrode of the cathode ray tube 122 by means of the grid modulator circuit 131 in order to reinforce the illumination of the line that is being scanned, e. g. of line 125 in Fig. 11.

In the described devices, the luminous traces that indicate the stations in course of emission may be like the ones shown at 141 and 145 on the reference lines 140 in Fig. 12, these traces appearing under a graduated scale 142. The scanning bases may be arranged to produce relatively long traces. However, if each scanning line is assigned to a wide frequency range in which a large number of transmitting stations are likely to be in operation, or in the case of shorter scanning lines, then sharper traces like trace 143 or trace 146 on the reference line 144 of Fig. 13 may be produced. Traces of this kind are easily obtained in receivers having rotating plate condenser scanning, for example. If it is desired to effect a very wide scanning, a high capacitance condenser may be used and the range spread by employing known combinations of capacities in series and in parallel in the tuning circuits. The bilateral shapes 145 or 146 may be obtained by using the change of phase of the intermediate frequency voltage as it passes through the resonance of the circuit. For the shape 146, use may also be made of selective circuits that will transform trace 145, or else of the rapid passage of point 147 to point 148 of trace 145. It is also possible to use two secondaries tuned to two frequencies slightly higher and lower than the resonance frequency in order to produce a trace of very slight width by means of a low frequency resonance or suitably coupled circuit.

It is evident that the invention is not limited to the arrangements shown and described but, on the contrary, is capable of numerous modifications and adaptations without departing from its scope.

I claim:

1. A system for analyzing a predetermined band in the radio frequency spectrum comprising a radio receiver, means repeatedly to tune said receiver through said frequency band, a cathode ray tube, means under control of said first mentioned means to cause the electron beam of said cathode ray tube to trace a plurality of separate predetermined paths which are superposed, each path corresponding to a portion of the frequency spectrum, and means under control of the output of said receiver to cause said electron beam to deviate in a predetermined manner from a particular path when said receiver receives a signal being transmitted within said frequency band, means for controlling the electron beam on the cathode ray tube to describe circular paths and means for spacing said paths at different distances from the center of the tube.

2. A system for analyzing a plurality of different radio frequency bands comprising timing means for sequentially selecting each of said bands, means for continuously scanning each of said selected bands in synchronism with said timing means to derive waves contained in said band, a cathode ray indicator comprising rotatable deflection elements, means for rotatably synchronizing said elements with said timing means for producing a circular trace on the screen of said indicator, means for applying said derived waves to said elements to produce separated indications on said trace, means synchronized with said timing means for producing respective concentric circular traces for each of said selected bands radially separated from one another.

3. An arrangement according to claim 2, wherein said timing means comprises a motor for sequentially coupling separate fixed tuning elements to a common variable tuning element and for continuously varying said common tuning element for scanning each of said selected bands, a source of different bias voltages said motor coupling different biassing voltages corresponding to a selected band to said deflection elements for separating said traces.

RENÉ HARDY.

REFERENCES CITED

The following references are of record in the file of this patent:

UNITED STATES PATENTS

| Number | Name | Date |
|---|---|---|
| Re. 22,150 | Bagno et al. | Aug. 4, 1942 |
| 1,917,268 | Mirick | July 11, 1933 |
| 1,994,232 | Schuck, Jr. | Mar. 12, 1935 |
| 2,084,760 | Beverage | June 22, 1937 |
| 2,098,695 | Southwick | Nov. 9, 1937 |
| 2,130,913 | Tolson | Sept. 20, 1938 |
| 2,159,790 | Freystedt et al. | May 23, 1939 |
| 2,189,549 | Hershberger | Feb. 6, 1940 |
| 2,213,886 | Potter | Sept. 3, 1940 |
| 2,233,275 | Wolff | Feb. 25, 1941 |
| 2,273,914 | Wallace | Feb. 24, 1942 |
| 2,275,460 | Page | Mar. 10, 1942 |
| 2,279,151 | Wallace | Apr. 7, 1942 |
| 2,279,246 | Podliasky et al | Apr. 7, 1942 |
| 2,312,203 | Wallace | Feb. 23, 1943 |
| 2,378,604 | Wallace | Jan. 19, 1945 |

FOREIGN PATENTS

| Number | Country | Date |
|---|---|---|
| 465,461 | Great Britain | Apr. 29, 1937 |
| 518,031 | Great Britain | Feb. 15, 1940 |

OTHER REFERENCES

The Cathode Ray Oscillograph in Radio Research, by Watson Watt, pub. by His Majesty's Stationery Office, London, 1935 pp. 81–89.

Radio, March 1942, pages 15 to 18 and 46 to 49.